May 4, 1965   G. B. GRONVOLD   3,181,951
COFFEE BREWING METHOD
Filed Sept. 28, 1960   2 Sheets-Sheet 1

George B. Gronvold  INVENTOR.

BY *[signatures]*
Attorneys

May 4, 1965   G. B. GRONVOLD   3,181,951
COFFEE BREWING METHOD
Filed Sept. 28, 1960   2 Sheets-Sheet 2
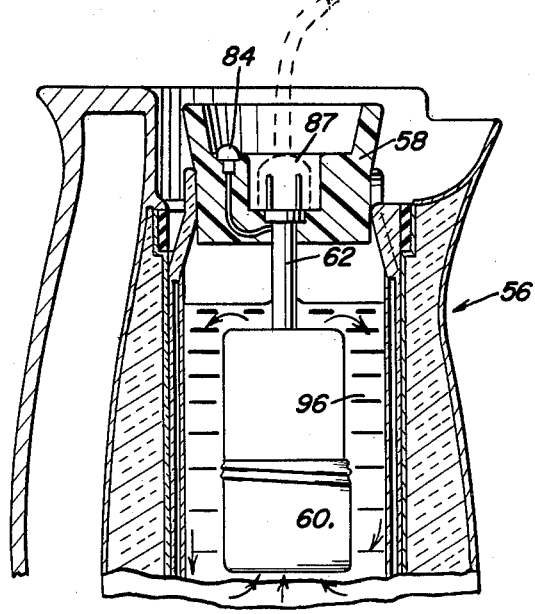
Fig. 5
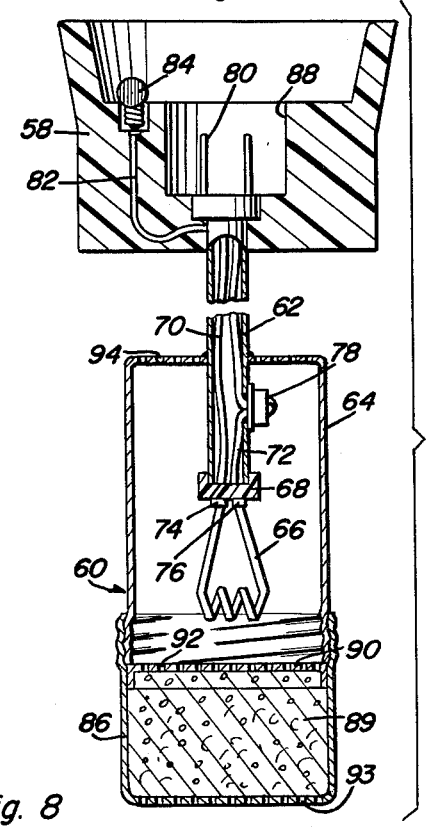
Fig. 6
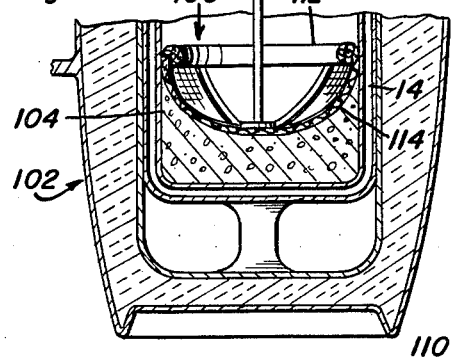
Fig. 9
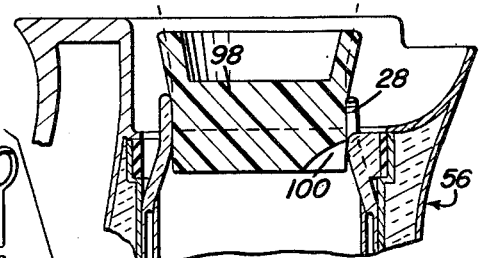
Fig. 8
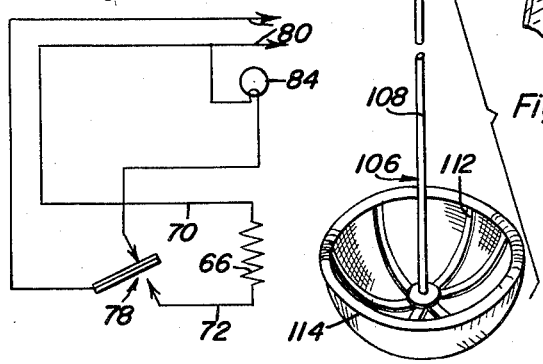
Fig. 7
Fig. 10
George B. Gronvold
INVENTOR.
BY Clarence A. O'Brien
and Harvey B. Jacobson
Attorneys

United States Patent Office 3,181,951
Patented May 4, 1965

3,181,951
COFFEE BREWING METHOD
George B. Gronvold, P.O. Box 727, Vancouver, Wash.
Filed Sept. 28, 1960, Ser. No. 58,955
5 Claims. (Cl. 99—71)

This invention relates to a novel method for brewing coffee, tea, cocoa, or the like and the apparatus associated with such novel method.

The method of this invention represents a complete departure from the brewing method presently used in connection with the making of coffee as one example. It is therefore a primary object of this invention to provide a brewing method which avoids the disadvantages of present brewing methods to produce a significantly improved beverage with respect to both flavor and digestive compatibility.

Another object of this invention is to provide a novel method and apparatus for brewing in both an economical and rapid manner avoiding the deleterious effects of previous coffee brewing methods on the brewed beverage produced thereby.

An additional object of this invention is to provide a novel brewing method wherein brewing occurs within a sealed and insulated vessel beginning at a maximum ideal temperature below boiling, the brewing action occurring during a slow reduction in temperature from the ideal maximum value until a minimum brewing temperature is reached at which point the brewing action is preferably stopped. The brewed liquid is then maintained sealed within the container to prevent rapid loss of heat for subsequent drinking purposes when the beverage attains a drinking temperature.

A still further object of this invention is to provide a novel method for brewing coffee or the like within a sealed insulated container, the brewing beginning at a maximum ideal temperature below the boiling point of water to thereby avoid the deleterious effects of prolonged high temperature brewing of coffee by previous brewing processes which not only drive-off the finer coffee flavors from the brew but also release into the brew undesirable acids.

It has been found that in the brewing of coffee resulting from the contact of heated water with coffee granules, various materials are released from the brewing coffee substance at different temperatures of the brewing liquid and to different extents at the different temperatures. Generally, the light flavorful oils and other aromatic volatile materials are released from the coffee granules into the brewing liquid before the release of the other materials. The alkaloid stimulant, caffeine, is next released into the brewing liquid and finally the heavier oils and undesirable acid, are released into the brewing liquid. It has been found therefore, that above 186° F. in coffee brewing, a significant amount of the undesirable materials including the acids are released into the brewing liquid from the coffee granules which accounts for the bitter and acid taste often imparted to a coffee beverage. The longer the coffee is brewed at the higher temperatures above 186° F. the bitterer the coffee becomes. On the other hand, below 186° F. the lighter oils and the caffeine previously released from the coffee granules are readily soluble, so that the 186° F. temperature value represents an ideal maximum brewing temperature below which the desirable materials released from the coffee solids will be recondensed into the brewing liquid and yet avoid release of any significant amount of undesirable materials caused by prolonged high temperature brewing above 186° F. The method of this invention therefore takes advantage of the above noted phenomena by restricting the brewing operation below 186° F. Inasmuch as brewing must occur within a lower temperature range pursuant to this invention, it will accordingly be necessary to prolong the brewing within the lower temperature range defined between the ideal maximum value of 186° F. and a minimum brewing temperature somewhat above the drinking temperature at which minimum brewing temperature most of the desirable materials will have been recondensed into the brewing liquid. Brewing must therefore occur at a reduced rate of heat transfer from the brewing liquid in order to maintain the brewing liquid within the above stated temperature range a sufficient length of time to permit reentry of the desirable materials into the brewing liquid. The method therefore also contemplates sealing the brewing liquid within an insulated container both for reducing the rate of heat transfer and for preventing escape of the desirable volatile materials.

It will therefore be appreciated that in previous brewing methods the more prolonged higher temperature brewing not only releases into the brewing liquid the undesirable acid oils which ultimately render the beverage bitter but also more rapidly drives off the desirable volatile flavor oils that escape from the container unsealed before completion of the brewing process. It will therefore be apparent that the present novel method of brewing both reduces the acid content of the beverage produced which often contributes to digestive ailments and also produces a more flavorful and stimulating beverage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is a partial sectional view of a second form of coffee brewing apparatus.

FIGURE 6 is an enlarged sectional view of a removed portion of the coffee brewing apparatus of FIGURE 5.

FIGURE 7 is a schematic illustration of a circuit diagram associated with the coffee apparatus illustrated in FIGURES 5 and 6.

FIGURE 8. is a partial sectional view of the coffee brewing apparatus of FIGURE 5 conditioned for pouring purposes.

FIGURE 9 is a partial sectional view of a bottom portion of a third form of coffee brewing apparatus.

FIGURE 10 is a perspective view of an insertable part associated with the third form of coffee brewing apparatus of FIGURE 9.

Figure 1:
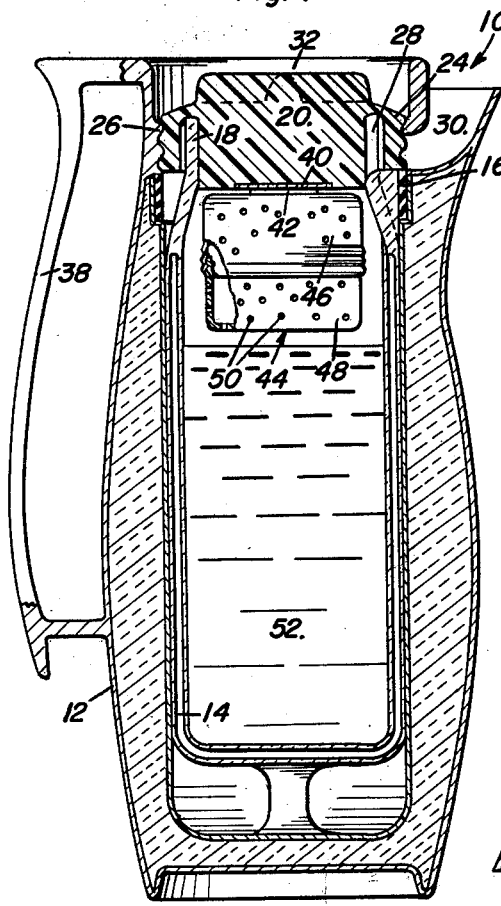
FIGURE 1 is a sectional view taken through a coffee brewing device made in accordance with this invention shown in an upright position after the brewing operation has ceased.
Figure 2:
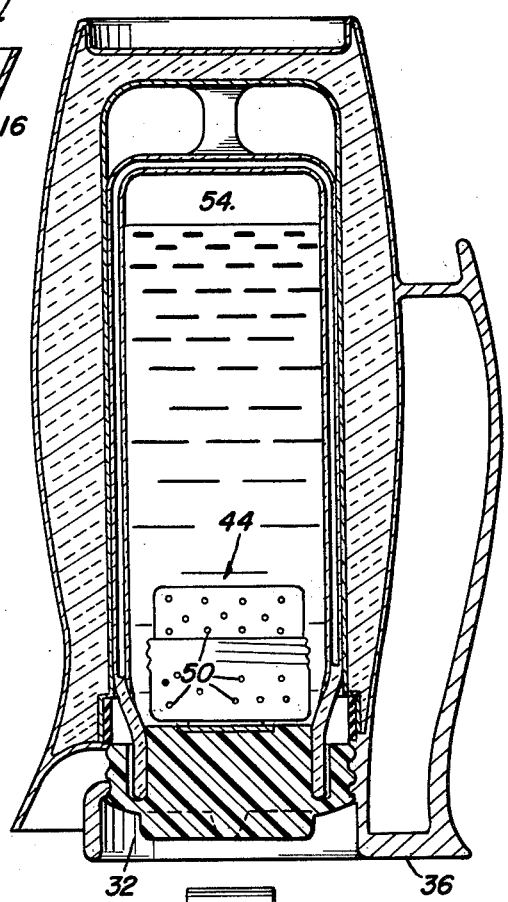
FIGURE 2 is a side elevational view of the coffee brewing apparatus illustrated in FIGURE 1 but shown in an inverted position during the brewing operation.
Figure 3:
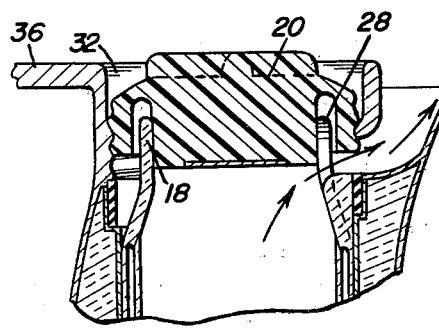
FIGURE 3 is a partial sectional view of an upper portion of the coffee brewing apparatus illustrated in FIGURES 1 and 2 conditioned for pouring of the beverage therefrom.

Referring to the drawings in detail, FIGURES 1 through 4 illustrate one form of brewing apparatus for practice of the novel method of this invention, the principles of which were hereinbefore explained. It will therefore be observed in FIGURES 1 through 4 that the brewing apparatus generally designated by reference numeral 10 includes an outer casing 12 within which a vacuum type glass bottle container 14 is disposed. Accordingly, the vacuum bottle container or vessel 14 will be of the usual conventional construction having a silvered outer surface and being supported within the casing 12 and separated therefrom by an insulated space which is sealed adjacent the top of the container 14 by sealing member 16. It will also be noted that the upper portion 18 of the container 14 is narrower to a certain extent for receiving a sealing stopper member 20. The stopper member 20 has upstanding ridges 22 as more clearly seen in FIGURE 4 to enable manual manipulation thereof. The stopper elements therefore also includes a threaded portion 24 which cooperates with internal threaded portions 26 adjacent the top of the casing 12 for effectively positioning the stopper member 20 in a completely closed position as illustrated in FIGURES 1 and 2 or in a pouring position as illustrated in FIGURE 3.

It will therefore be observed that an opening 28 is formed at the top portion 18 of the container 14 through which the brewed liquid may be poured. Accordingly aligned with the opening 28 is a spout formation 30 on the casing member 12. The stopper member 20 as illustrated in FIGURES 1 and 2 is therefore positioned to its inward position so that no liquid may escape through the opening 28. Accordingly, the brewing apparatus may be inverted as illustrated in FIGURE 2 for brewing purposes as will hereinafter be explained. When the brewed beverage is ready for drinking the stopper member may then be upwardly screwed to the position illustrated in FIGURE 3 so that the beverage may then be poured from the spout 30 and the stopper may yet maintain some sealing so as to prevent rapid reduction in temperature of the beverage.

Figure 4:
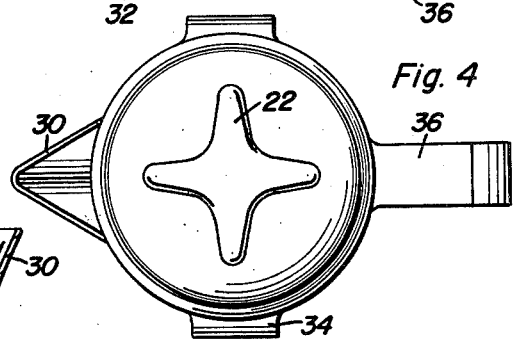
FIGURE 4 is a top plan view of the apparatus illustrated in FIGURE 1.

It will therefore be observed that the upper portion 32 of the casing 12 also includes lateral projections 34 and a top handle projection 36 opposite the spout 30 as more clearly seen in FIGURE 4 whereby the device may be maintained in stable condition in an inverted position as illustrated in FIGURE 2. A handle 38 is therefore also connected to the casing 12 and extends below the projecting handle portion 36 when the device is in an upright position as seen in FIGURE 1.

It will also be observed that set into the bottom surface of the stopper element 20 is a magnetically attractable plate element 40 which cooperates with a magnet 42 secured to the top of a coffee container generally indicated by reference numeral 44. In FIGURE 1, it will therefore be observed that the top portion 46 of the coffee container is internally threaded at its lower end for threadedly receiving therewithin the bottom portion 48 of the coffee container. Both portions 46 and 48 have a plurality of apertures 50 therein whereby the coffee within the container 44 may come in contact with the brewing liquid but will be confined within the container. As seen in FIGURE 1, the brewed liquid 52 is disposed beneath the container 44.

From the foregoing description of the apparatus illustrated in FIGURES 1 through 4, practice of the novel method of this invention will become apparent. Accordingly, a container 44 full of coffee may be set into the vacuum container 14 with the coffee container initially resting at the bottom of the vacuum container 14. One means for beginning the brewing at the ideal maximum temperature, is to add boiling water to the container 14 above the coffee containing container 44. Inasmuch as the apparatus 10 including the bottle 14, coffee solids and container 44 are at room temperature, the boiling water is immediately reduced in temperature to a resultant value approximating 186° F. which is the ideal maximum brewing temperature hereinbefore discussed. The stopper element 20 is then immediately secured to the container 14 in its innermost position in order to vapor seal the insulated container 14 with the water or brewing liquid 52 therein at approximately 186° F. for contact of the liquid with the coffee granules within the coffee container 44 at the bottom of the vacuum bottle 14. The device 10 may then be inverted to the position illustrated in FIGURE 2. While brewing, the temperature of liquid 52 will gradually be reduced from the 186° F. maximum during which time first the light flavor oils and next the caffeine will be released from the coffee granules by the water contact and flotation and mixed with the brewing liquid 52 as said oils rise through the liquid. Any volatile materials not immediately condensed into the brewing liquid 52 will be trapped in the air space 54 above the brewing liquid as seen in FIGURE 2. Accordingly, when the temperature of the brewing liquid has reduced to the minimum brewing temperature, at which point the desirable materials will have been condensed back into the liquid, the apparatus 10 may be returned to its upright position as illustrated in FIGURE 1. The time for brewing may therefore be obtained through practice, which will depend on the heat transfer characteristics of the vacuum container and the particular size and surface area thereof.

It will therefore be appreciated that when the device 10 is returned to the upright position of FIGURE 1 the coffee container 44 will be retained on the metallic plate 40 by means of the magnetic element 42 on the container 44. The brewed liquid may therefore drain from the container into the body of the liquid until the brew has further reduced in temperature to a drinking temperature. The stopper element 20 may then be withdrawn completely with the coffee container 44 and then reinserted without the coffee container as illustrated in FIGURE 3. Pouring of the beverage may then be effected. When desired the stopper element 20 may be rotated to its innermost position for maintaining the beverage warm for a prolonged period of time for subsequent consumption.

Referring now to FIGURES 5 and 6 a second form of brewing apparatus generally designated by reference numeral 56 is illustrated. The vacuum container portion of the apparatus is identical to the apparatus illustrated in FIGURES 1 through 4. However, in the apparatus 56, the stopper element and coffee container portion differs from that described with respect to FIGURES 1 through 4 and relates to another means for initiating brewing at the ideal maximum temperature. It will therefore be observed that the stopper element 58 is connected to the container generally indicated by reference numeral 60 by means of a tubular member 62. Referring therefore to FIGURE 6 in particular it will be observed that the container 60 includes an upper portion 64 secured as by welding to the tubular member 62 which tubular member 62 also extends within the upper portion of the container 64. Mounted at the lower end of the tubular member 62 is a heating element 66 insulated from the tubular member 62 by means of member 68. Electrical wires 70 and 72 respectively connected to the terminals 74 and 76 of the heating element 66, provide the electric current for the heating element. A thermostatically operated switch device 78 is therefore connected to the wire 72 in the circuit in order to cut off the current to the heating element 66 when the temperature of the brewing liquid has attained the predetermined ideal maximum value.

It will also be observed that the stopper element 58 to which the tubular member 62 is connected mounts the terminal prongs 80 and also an electrical connection 82 to an indicating bulb member 84. Accordingly, when the stopper element 58 and container 60 connected thereto is installed within the vacuum container as illustrated in FIGURE 5 an electrical connector 87 may be applied to the prongs 80 within the recess 88 in the stopper element 58 to supply current to the heating element 66. Referring therefore to FIGURE 7 it will be observed that a voltage applied across the prongs 80 will energize the heating element 66 when the thermostatic switch device 78 is in one position while the indicating light 84 will be energized when the thermostatic switch device 78 is in the other and illustrated position of FIGURE 7.

Accordingly, the thermostatic switch device 78 is normally in the non-illustrated position wherein the heating element 66 is effective to heat the liquid up to the ideal 186° F. temperature at which point the thermostatic switch device 78 will be moved to the position illustrated in FIGURE 7 opening the circuit to the heating element 66 and closing the circuit to the light bulb 84 so as to indicate that brewing has begun.

It will be observed that the bottom portion 86 of the container 60 is internally threaded at its upper portion for connection to the upper portion 64 of the container. The coffee granules 89 are disposed within the bottom portion 86 and separated from the top portion by means of a separator plate member 90 having a plurality of holes or perforations 92 therein. It will also be observed that the bottom of the bottom portion 86 has apertures 93 therein while the top portion of the upper portion 64 of the container has apertures 94 therein.

From the foregoing description of FIGURES 5 and 6 practice of the novel method will become apparent. Accordingly, water 96 is admitted to the vacuum container and the stopper element 58 with the container member 60 inserted therein as illustrated in FIGURE 5. The connector 87 may then be plugged in so that current will be supplied to the heating element 66. The temperature of the water which has entered the upper portion of the container 60 through the upper apertures 94 will be rapidly heated causing thermal circulation of the heated water through the container as illustrated by the arrows in FIGURE 5. The water 96 will therefore immediately be increased in temperature until it reaches 186° F. at which point the thermostatically operated switch device 78 will open the heating circuit and the light 84 will indicate that brewing has begun. From that point on, the apparatus may be timed for brewing. It will be observed therefore that the liquid 96 will come in contact with the coffee 89 within the bottom portion 86 of the container 60 through the apertures 92 and 93 for release of the desirable materials by flotation as hereinbefore described. When the minimum brewing temperature has been reached, the stopper 58 together with the container 60 may be withdrawn from the vacuum container. A second stopper element 98 may then be inserted into the brewing apparatus 56 as illustrated by solid line of FIGURE 8 and will then retain the beverage at a warm condition for subsequent drinking. When it is desired to pour the beverage, the stopper element 98 may be moved to an upper position as illustrated by dotted line in FIGURE 8 so that the passage 100 formed therein may be aligned with the opening 28 for pouring of the beverage therethrough.

In FIGURES 9 and 10 a third variation of the coffee brewing apparatus is illustrated. In this latter form of apparatus generally designated by reference numeral 102, the coffee 104 may be confined to the bottom of the vacuum container 14 by means of a separating device generally indicated by reference numeral 106. Boiling water may then be admitted to the container 14 above the coffee and separated therefrom by means of the separating device 106 which is snugly disposed within the container 14. The liquid may then brew with a sealing stopper element inserted at the top of the container 14 as hereinbefore described. It will be observed that the separating device 106 includes elongated rod member 108 having an eye 110 at the top thereof for manual manipulation while at the bottom of the rod 108 a plurality of flexible fingers 112 are disposed. A mesh-like material 114 is mounted over the flexible fingers 112 which normally hold the mesh material extended outwardly. The fingers therefore extend outwardly to a diameter exceeding the internal diameter of the container. When the device 106 is inserted into the container 14, however, the support fingers 112 will flex inwardly permitting the device to be inserted downwardly into contact with the coffee 104 with the fingers snugly biasing the mesh material 114 up against the sides of the container 14 as illustrated in FIGURE 9. The coffee 104 may thereby be effectively separated from the brewing liquid thereabove and yet be in contact therewith.

From the foregoing description, it will be appreciated that the apparatus for practicing the novel method of this invention including the different apparatus variations all involve a brewing method restricted to a temperature range between an ideal maximum temperature value of 186° F. for coffee or a temperature below which the significant amounts of undesirable materials will not be released from the brewing solids. The minimum brewing temperature for the brewing temperature range will be that temperature at which the desirable materials released from the brewing solids will have been recondensed into the brewing liquid. The brewing is therefore performed within the sealed container barring the escape of the desirable volatile type materials. Also, the brewing is performed within a vacuum type of container or one in which the heat transfer rate has been significantly reduced since the brewing is accomplished at lower temperatures and hence must be retained at the temperature range indicated for a longer period of time than would be the case if the transfer were to occur directly from the brewing liquid to room temperature at the usual heat transfer rate of ordinary coffee containers. As a result of the novel method and the apparatus for performing the method, a significantly improved beverage is produced.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. A method for brewing coffee by contact of water with solids comprising the steps of: establishing contact between the solids and the water at an ideal maximum temperature to form a brewing liquid; reducing the rate of heat transfer from the brewing liquid for a gradual reduction in temperature thereof and preventing escape of volatiles from the brewing liquid released by contact thereof with the solids; said ideal maximum temperature being 186° F. above which significant amounts of undesirable materials are released into the brewing liquid but below which the desirable materials are released into the brewing liquid; stopping the brewing when the temperature of the brewing liquid has fallen to a minimum temperature above drinking temperature, said minimum brewing temperature being those temperatures at which the desirable materials condense into the brewing liquid.

2. A method of brewing by continuous and complete contact of liquid with solids selected from the group consisting of coffee, tea and cocoa under prescribed conditions resulting in the release of desirable volatile and nonvolatile materials from the solids into the liquid comprising the steps of: elevating the liquid to a boiling temperature; cooling the liquid to a maximum ideal brewing temperature below said boiling temperature within a confined zone, sealing said zone, establishing contact of all of said solids with the liquid within said zone only when the temperature thereof has declined to said maximum ideal temperature; maintaining said zone sealed at said maximum ideal temperature, reducing the rate of cooling of the liquid from said maximum ideal temperature to control the period of contact between the liquid and solids under conditions prevailing in said sealed zone to permit release of substantially all of said desirable materials from the solids; holding all of said solids below the level of the liquid under said prevailing conditions within said sealed zone for mixing of the materials released from the solids with the liquid; inverting the liquid within said sealed zone for mixing and trapping of materials within said sealed zone; and removing the solids from contact with the liquid at a temperature thereof between liquid drinking temperature and said maximum ideal brewing temperature to prevent release of undesirable materials from the solids into the liquid.

3. A method of brewing by continuous and complete contact of liquid with coffee solids under prescribed conditions resulting in the release of desirable volatile and non-volatile materials from the solids into the liquid comprising the steps of: elevating the liquid to a boiling temperature; cooling the liquid to a maximum ideal brewing temperature below said boiling temperature within a confined zone; sealing said zone; establishing contact of all of said solids with the liquid within said sealed zone only when the temperature thereof has declined to said maximum ideal temperature; maintaining said zone sealed at said maximum ideal temperature; reducing the rate of cooling of the liquid from said maximum ideal temperature to control the period of contact between the liquid and solids under conditions prevailing in said sealed zone to permit release of substantially all of said desirable materials from the solids; holding of said solids below the level of the liquid under said prevailing conditions within said sealed zone for mixing of the material released from the solids with the liquid; inverting the liquid within said sealed zone for mixing and trapping of materials within said sealed zone; and removing the solids from contact with the liquid at a temperature thereof between liquid drinking temperature and said maximum ideal brewing temperature at which the desirable volatile materials released from the solids recondense into the liquid, said maximum ideal brewing temperature being 186° F.

4. A method of brewing coffee under prescribed conditions including the steps of: establishing a brewing temperature range for liquid in complete and continuous contact with solids having a maximum temperature approximating an ideal value of 186° F. from which the liquid decreases until the solids are removed from contact therewith; and confining said liquid when in contact with the solids in a sealed zone at said maximum temperature for prescribing the conditions during which the release of materials from the solids and said decrease in temperature of the liquid occurs, said solids being removed from contact with the liquid at temperatures at which most of the desirable materials will have been recondensed into the liquid.

5. In a method of brewing coffee by contact of heated water with coffee granules that release flavorful oils, aromatic volatiles, alkaloid stimulants, and acids into the water at different temperatures and periods of contact including the steps of: restricting brewing to a temperature range below 186° F. as a maximum to prevent release of undesirable materials into the water; confining the brewing water to a pressure sealed atmosphere to prevent escape of said aromatic volatiles; controlling the duration of contact within said pressure sealed atmosphere by cooling of the water from 186° F. at a reduced rate of heat transfer until all of the flavorful oils and alkaloid stimulants have been substantially released from the solids and have entered the water; and removing said solids from contact with said water at the minimum temperature of said temperature range at which the desirable materials released from the solids recondense into the brewing water.

References Cited by the Examiner
UNITED STATES PATENTS

| | | | |
|---|---|---|---|
| 992,053 | 5/11 | Pike | 99—296 |
| 1,520,501 | 12/24 | Kohn. | |
| 1,594,786 | 8/26 | Lucas | 99—317 |
| 2,055,096 | 9/36 | Dehn et al. | 99—296 X |
| 2,338,140 | 1/44 | States | 99—71 |
| 2,344,386 | 3/44 | Berger | 99—319 |
| 2,514,596 | 7/50 | Crossley et al. | 99—71 |
| 2,602,223 | 7/52 | Pauhu | 317—159 X |
| 2,610,571 | 9/52 | Pouget | 99—317 |
| 2,770,958 | 11/56 | Carew | 317—159 |
| 2,826,980 | 3/58 | Willman | 99—317 |

A. LOUIS MONACELL, *Primary Examiner.*

ABRAHAM H. WINKELSTEIN, *Examiner.*